United States Patent
Wu et al.

(10) Patent No.: US 11,632,160 B2
(45) Date of Patent: Apr. 18, 2023

(54) OVERHEAD REDUCTION FOR CHANNEL STATE INFORMATION

(71) Applicant: QUALCOMM Incorporated, San Diego, CA (US)

(72) Inventors: Liangming Wu, Beijing (CN); Yu Zhang, Beijing (CN); Chenxi Hao, Beijing (CN); Qiaoyu Li, Beijing (CN); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/982,983

(22) PCT Filed: Apr. 3, 2019

(86) PCT No.: PCT/CN2019/081294
§ 371 (c)(1),
(2) Date: Sep. 21, 2020

(87) PCT Pub. No.: WO2019/192527
PCT Pub. Date: Oct. 10, 2019

(65) Prior Publication Data
US 2021/0036756 A1    Feb. 4, 2021

Related U.S. Application Data

(63) Continuation of application No. PCT/CN2018/082066, filed on Apr. 5, 2018.

(51) Int. Cl.
*H04B 7/06*     (2006.01)
*H04B 7/0456*   (2017.01)
*H04W 28/06*    (2009.01)

(52) U.S. Cl.
CPC ......... *H04B 7/0658* (2013.01); *H04B 7/0456* (2013.01); *H04B 7/0626* (2013.01); *H04B 7/0639* (2013.01); *H04W 28/06* (2013.01)

(58) Field of Classification Search
CPC .. H04B 7/0658; H04B 7/0456; H04B 7/0626; H04B 7/0639; H04B 7/0478; H04L 5/0048; H04L 5/001; H04W 28/06
See application file for complete search history.

(56) References Cited

U.S. PATENT DOCUMENTS

| | | | | |
|---|---|---|---|---|
| 2014/0362938 | A1* | 12/2014 | Krishnamurthy .... | H04B 7/0663 375/267 |
| 2015/0189644 | A1* | 7/2015 | Lorca Hernando .... | H04B 7/063 370/329 |

(Continued)

FOREIGN PATENT DOCUMENTS

| CN | 106856413 A | 6/2017 |
|---|---|---|
| WO | 2016179801 A1 | 11/2016 |
| WO | WO-2016179801 A1 * | 11/2016 |

OTHER PUBLICATIONS

International Search Report and Written Opinion—PCT/CN2019/081294—ISA/EPO—dated Jul. 1, 2019.

(Continued)

*Primary Examiner* — Habte Mered
(74) *Attorney, Agent, or Firm* — Qualcomm Incorporated

(57) ABSTRACT

Certain aspects of the present disclosure provide techniques for reducing overhead for channel state information (CSI). Certain aspects provide a method for wireless communication. The method generally includes receiving a channel state information reference signal (CSI-RS), determining one or more feedback components associated with a CSI feedback type based on the CSI-RS, identifying that a (Continued)

payload of the one or more feedback components is to be compressed, compressing the payload, and reporting the compressed payload.

28 Claims, 10 Drawing Sheets

(56) References Cited

U.S. PATENT DOCUMENTS

| | | | | |
|---|---|---|---|---|
| 2019/0229791 | A1* | 7/2019 | Song | H04B 7/0626 |
| 2019/0260429 | A1* | 8/2019 | Xu | H04B 7/0456 |
| 2019/0342768 | A1* | 11/2019 | Xu | H04B 7/0417 |
| 2020/0186207 | A1* | 6/2020 | Davydov | H04B 7/0426 |

OTHER PUBLICATIONS

International Search Report and Written Opinion—PCT/CN2018/082066—ISA/EPO—dated Jan. 4, 2019.

NTT DOCOMO, "Remaining Issues Feedback Design for CSI Type I and II," 3GPP TSG RAN WGI Meetings 90bis R1-1718191, Oct. 9-13, 2017, Sections 1-2.

CATT UL UCI, "Enhancement for P-CSI Feedback," 3GPP TSG RAN WGI Meetings #82bis R1-155184, Oct. 5-9, 2015, Sections 1-2.

Intel Corporation: "On CSI Feedback Type II",3GPP TSG RAN WG1 #89, 3GPP Draft, R1-1707361 on CSI Feedback Type II, 3rd Generation Partnership Project (3GPP), Mobile Competence Centre, 650, Route Des Lucioles, F-06921 Sophia-Antipolis Cedex, France, vol. RAN WG1, No. Hangzhou, May 15, 2017-May 19, 2017, May 14, 2017 (May 14, 2017), pp. 1-7, XP051272573, Retrieved from the Internet: URL: http://www.3gpp.org/ftp/Meetings_3GPP_SYNC/RAN1/Docs/ [retrieved on May 14, 2017], The whole document.

Supplementary Partial European Search Report—EP19781897—Search Authority—Munich—dated Nov. 23, 2021.

Supplementary European Search Report—EP19781897—Search Authority—Munich—dated Feb. 24, 2022.

LG Electronics: "Discussion on CSI Feedback Type II", 3GPP TSG RAN WG1 Meeting#89, R1-1707611, Hangzhou, China, May 15-19, 2017, 6 Pages.

* cited by examiner

OVERHEAD REDUCTION FOR CHANNEL STATE INFORMATION

CROSS-REFERENCE TO RELATED APPLICATION & PRIORITY CLAIM

This application is a national stage application under 35 U.S.C. 371 of PCT/CN2019/081294, filed Apr. 3, 2019, which claims priority to International Application No. PCT/CN2018/082066, filed Apr. 5, 2018, both of which are hereby assigned to the assignee of the present application and hereby expressly incorporated by reference herein in their entireties.

BACKGROUND

Field of the Disclosure

Aspects of the present disclosure relate to wireless communications, and more particularly, to techniques for reducing overhead for channel state information (CSI), especially, for precoding matrix parameters of Type II CSI feedback employed in New Radio (e.g., 5G) communication systems.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between a base station and user equipment in a wireless network, such as reducing overhead for channel state information.

Certain aspects provide a method for wireless communication. The method generally includes receiving a channel state information reference signal (CSI-RS), determining one or more feedback components associated with a CSI feedback type based on the CSI-RS, identifying that a payload of the one or more feedback components is to be compressed, compressing the payload, and reporting the compressed payload.

Certain aspects provide a method for wireless communication. The method generally includes receiving a compressed payload of one or more feedback components associated with a channel state information feedback type, decompressing the compressed payload, and determining a precoding to use for multiple input multiple output (MIMO) communications based on the decompressed payload.

Aspects of the present disclosure also provide various apparatuses, means, and computer program products corresponding to the methods and operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
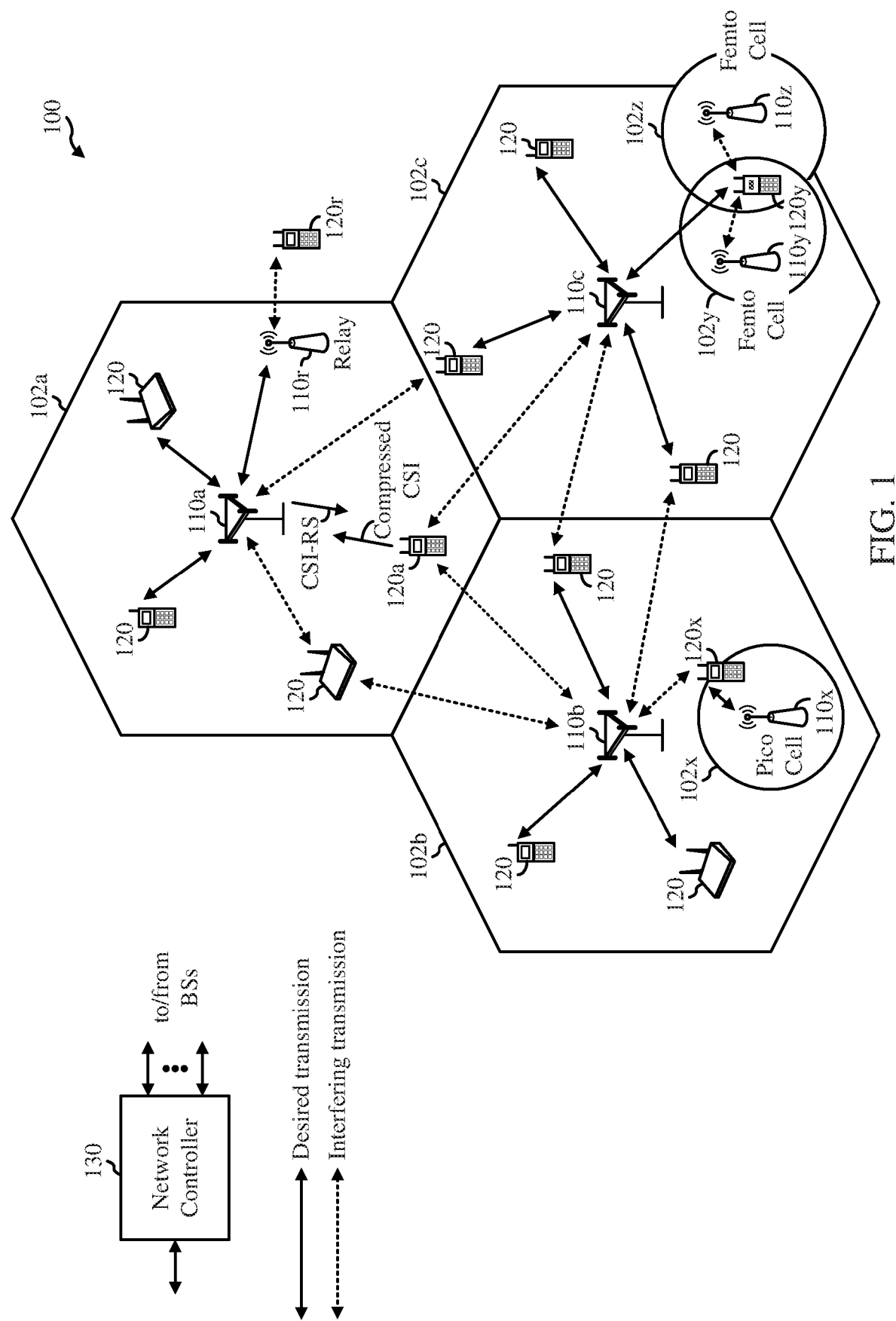
FIG. 1 is a block diagram conceptually illustrating an example telecommunications system, in accordance with certain aspects of the present disclosure.

Aspects of the present disclosure provide apparatus, methods, processing systems, and computer readable mediums for reducing overhead for channel state information.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE. CDMA, TDMA, FDMA. OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF), 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network.

Figure 7:
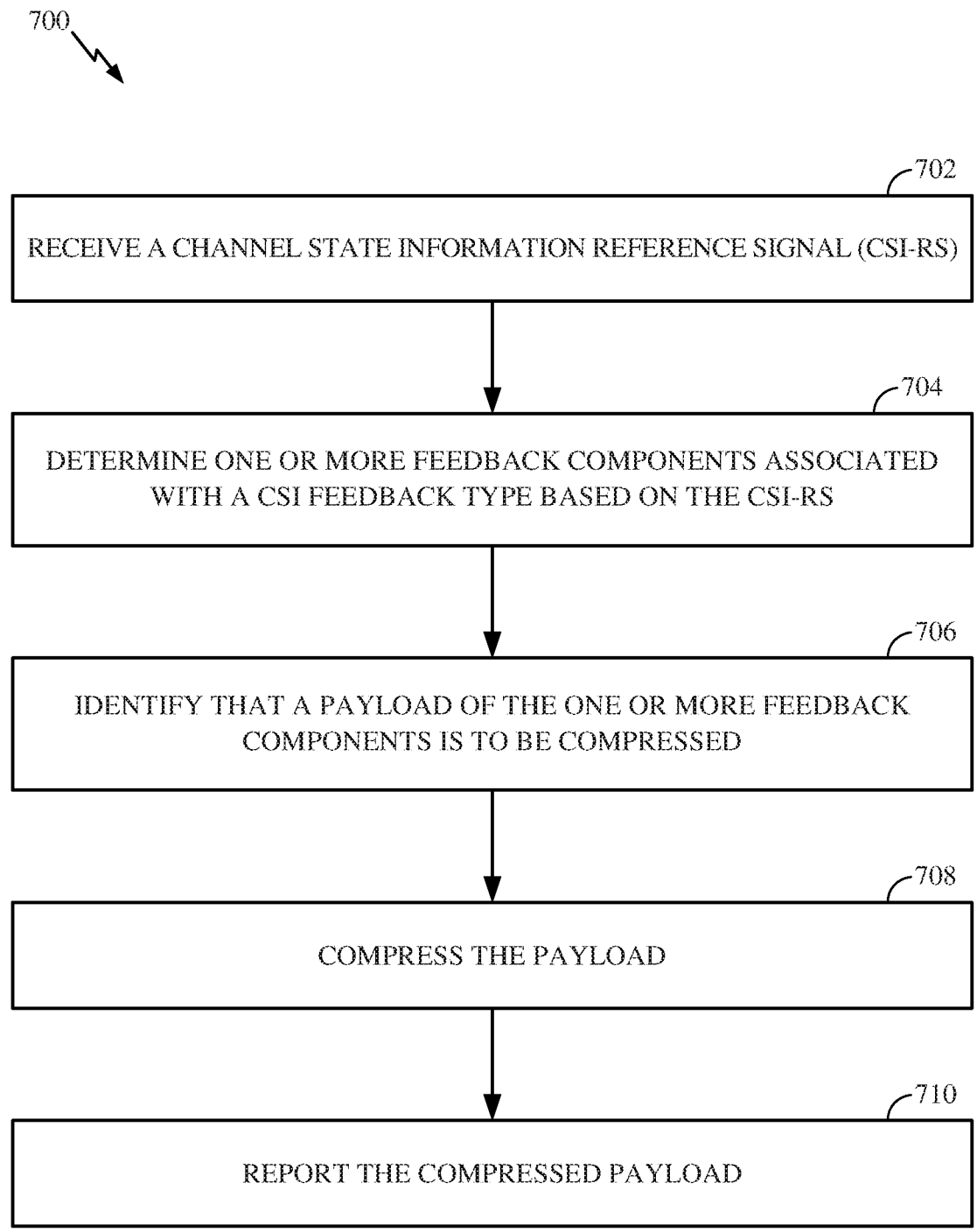
FIG. 7 is a flowchart illustrating example operations of wireless communications, in accordance with certain aspects of the present disclosure.
Figure 8:
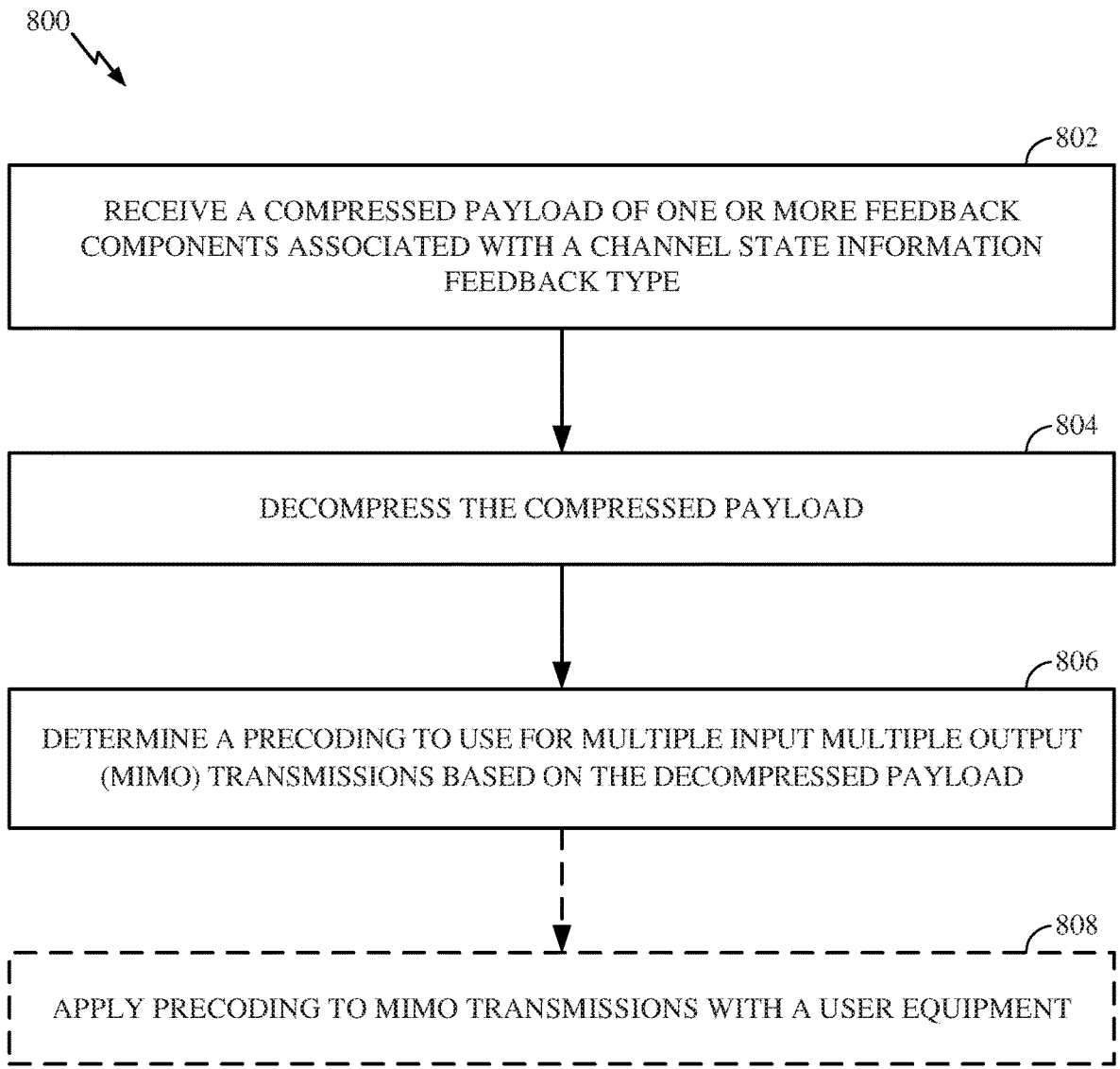
FIG. 8 is a flowchart illustrating example operations of wireless communications, in accordance with certain aspects of the present disclosure.
Figure 9:
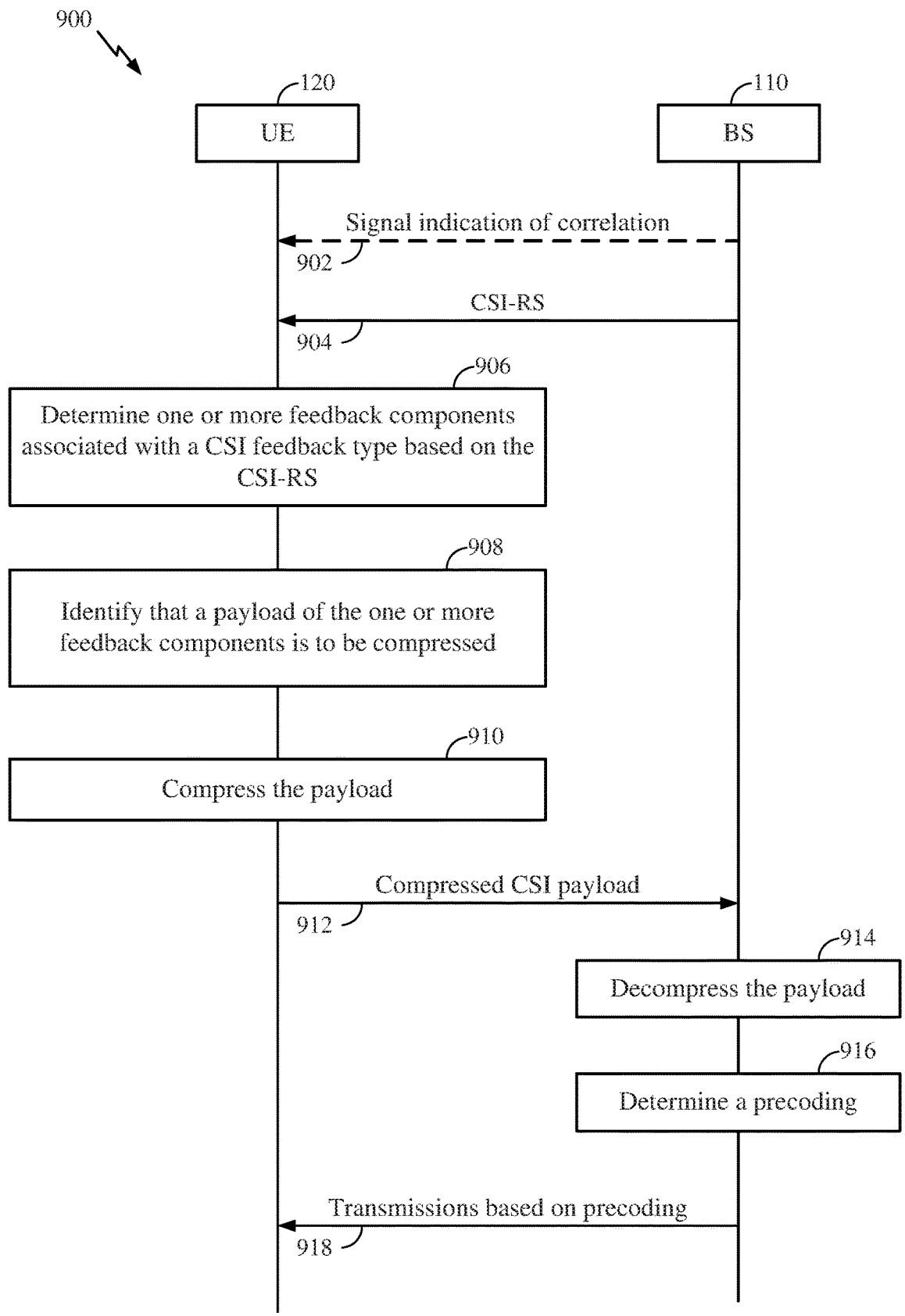
FIG. 9 is an example call flow diagram illustrating operations to reduce the overhead of channel state information, in accordance with certain aspects of the present disclosure.

The wireless communication network 100 may perform operations to reduce the overhead of channel state information (CSI) as further described herein, for example, as illustrated in FIGS. 7, 8, and 9. The UE 120a may receive a channel state information reference signal (CSI-RS) transmitted by the BS 110a. The UE 120a may compress a payload of one or more feedback components associated with CSI feedback and report the CSI feedback with the compressed payload. The BS 110a may decompress the CSI payload and determine a precoding for MIMO transmissions as further described herein.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
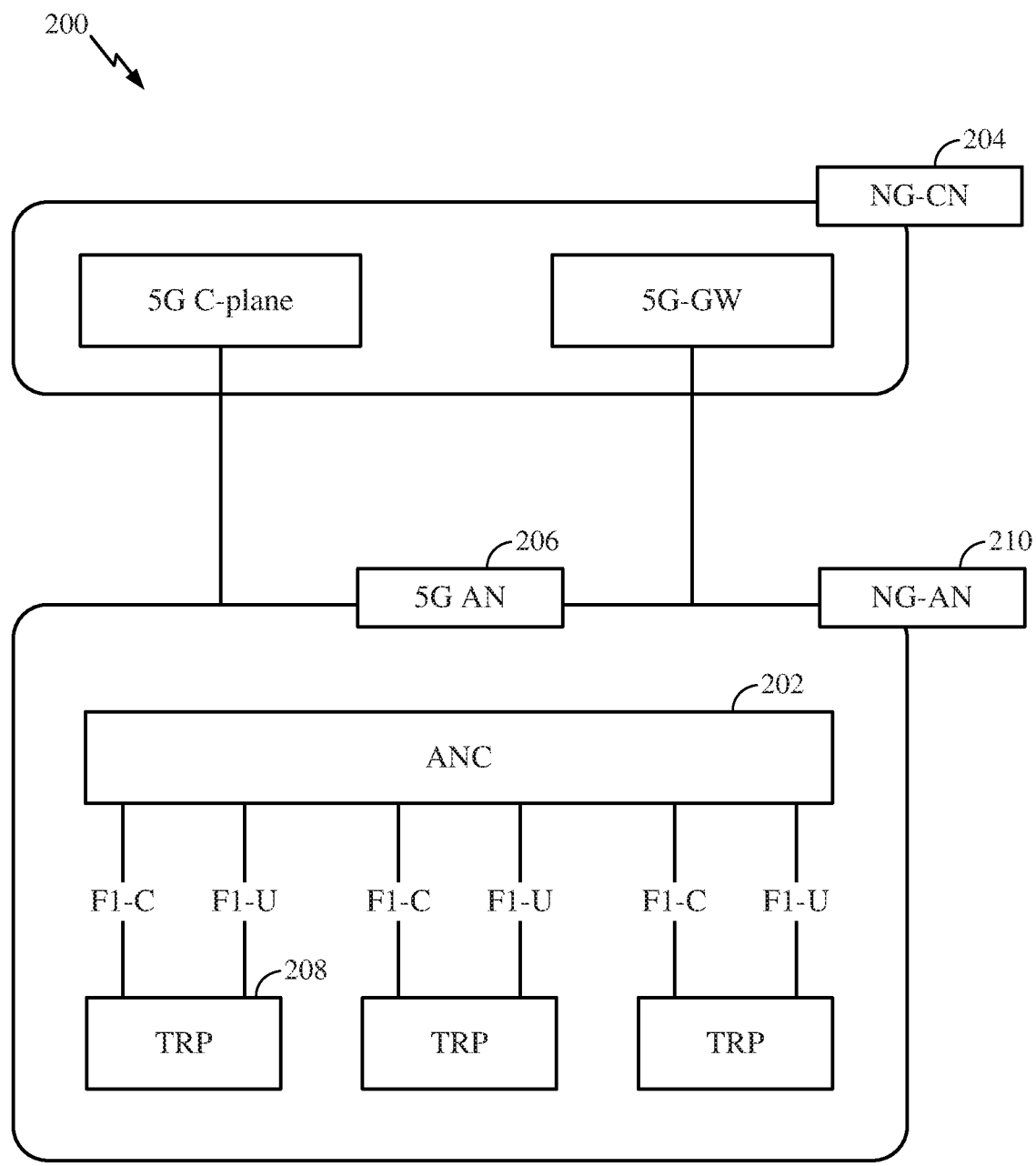
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
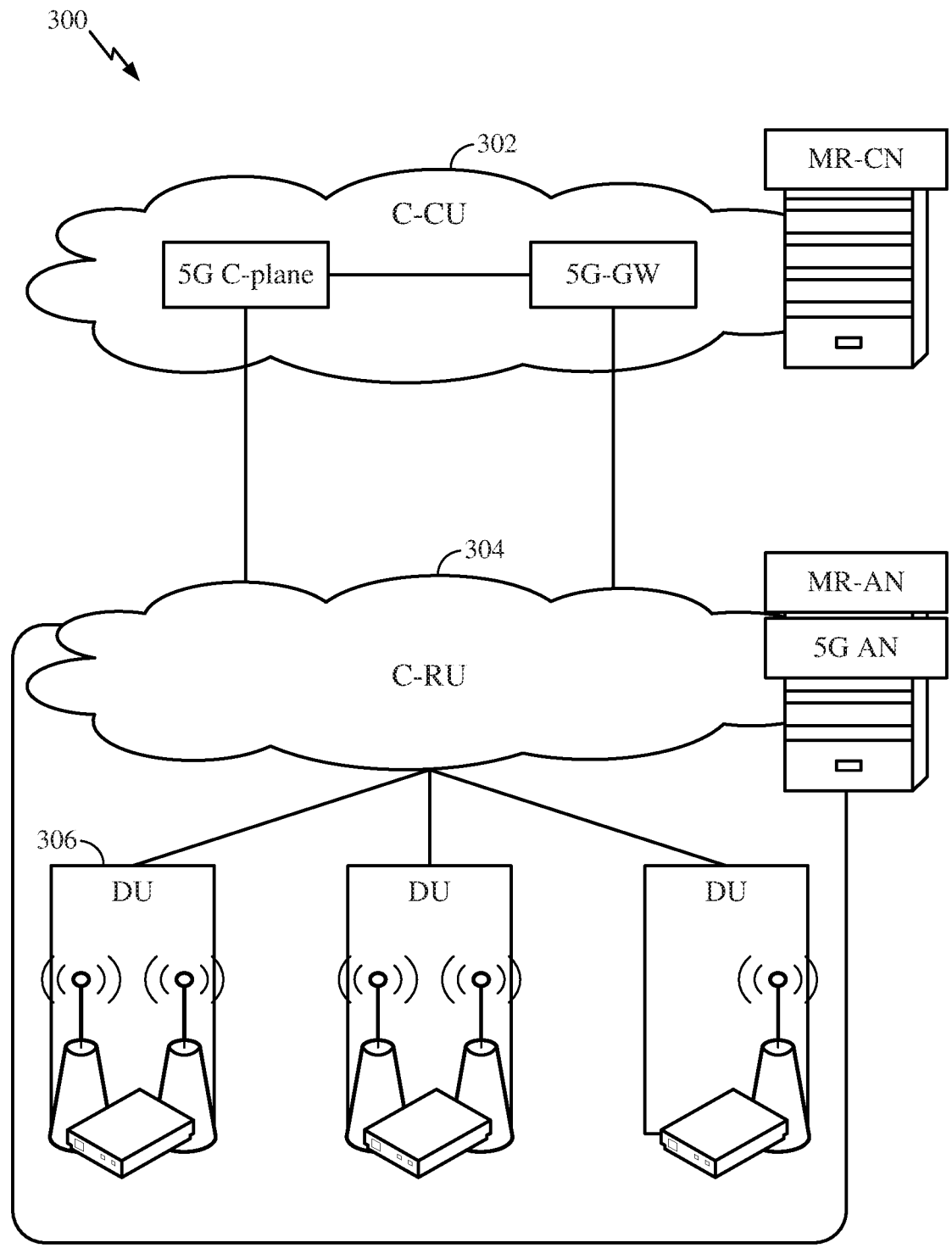
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
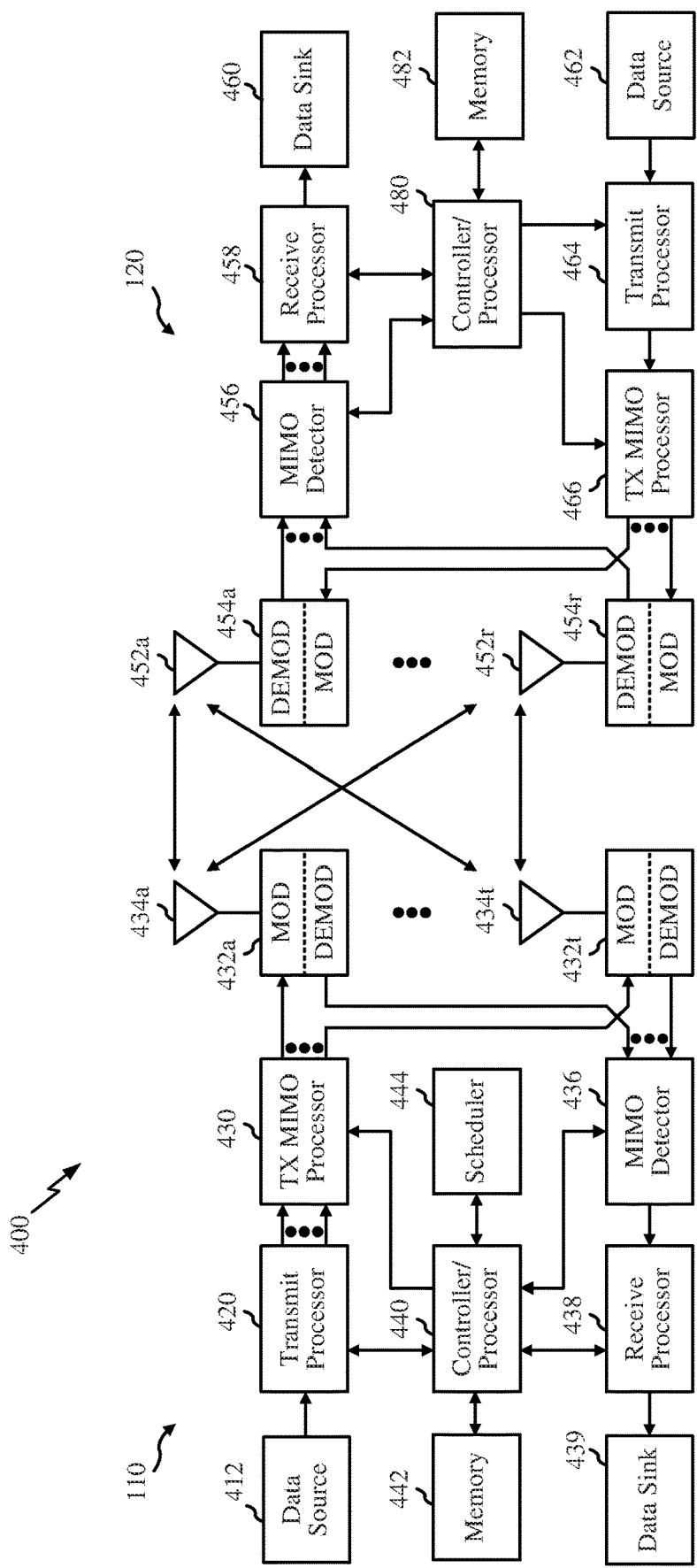
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 440, 438, and/or controller/processor 440 of the BS 110 may be used to perform the various techniques and methods described herein to reduce the overhead of channel state information, for example, the operations shown in FIGS. 7 and 8.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DE-MODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
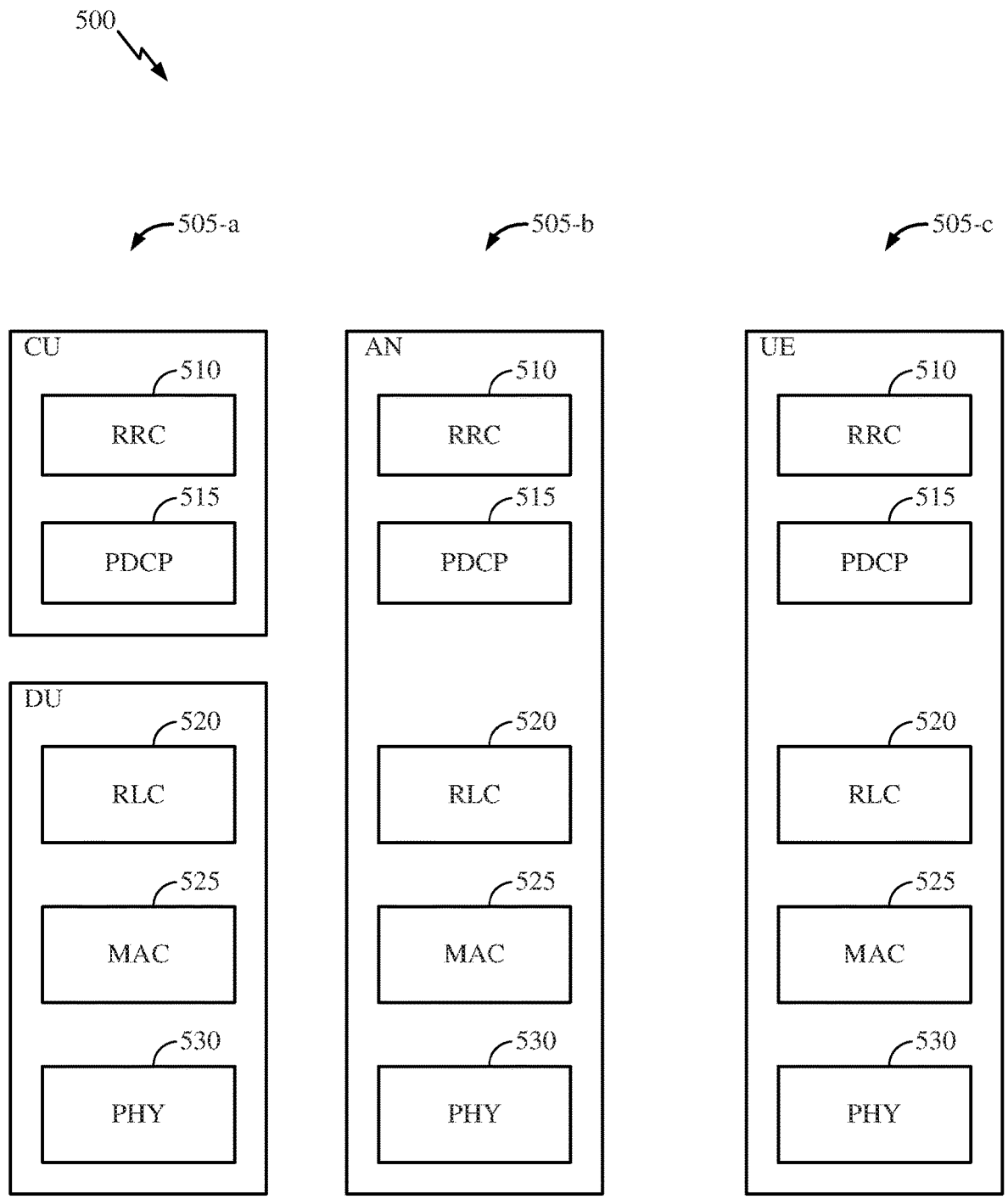
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option. RRC layer 510, PDCP layer 515. RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
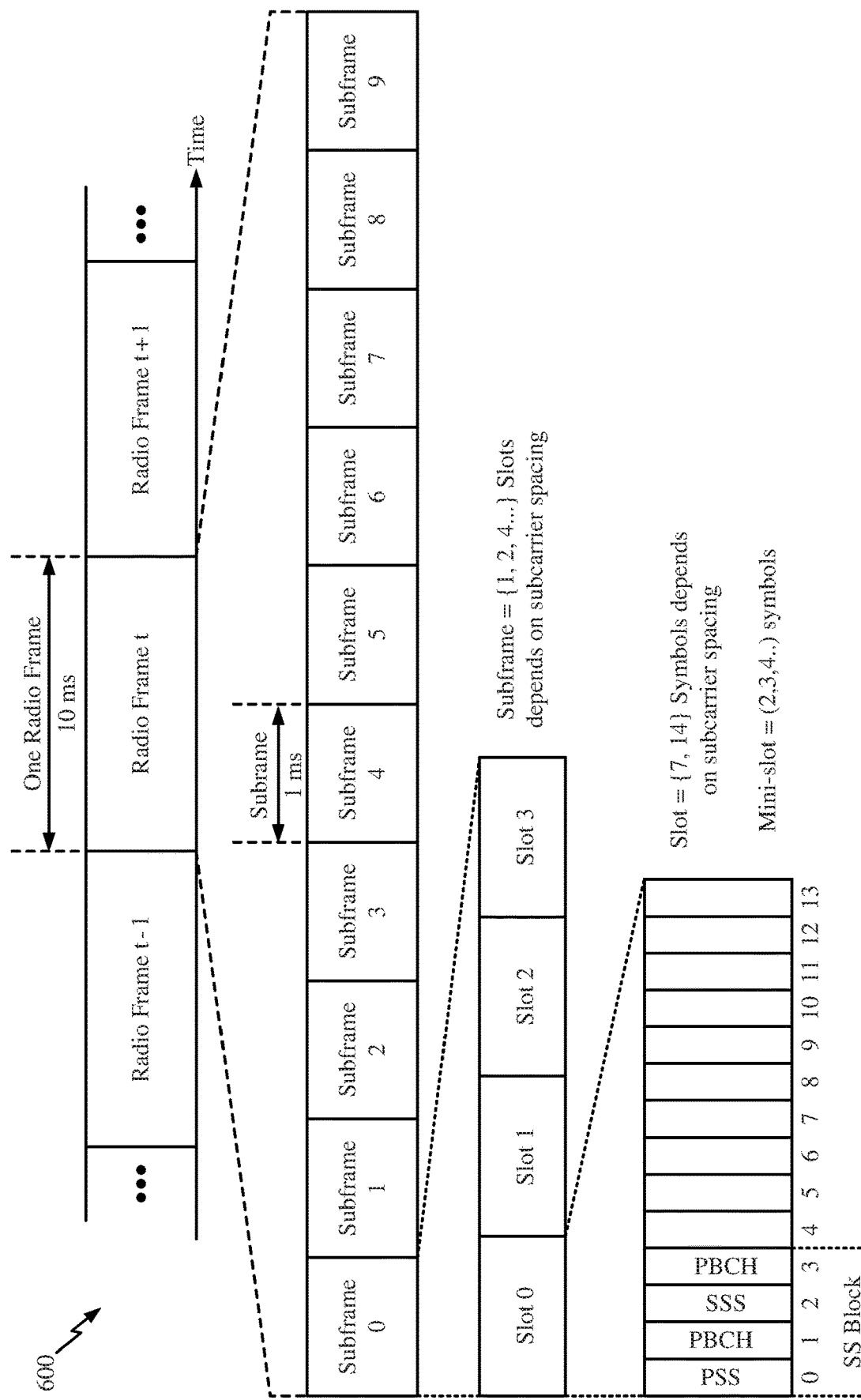
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping.

Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Overhead Reduction for Channel State Information

In wireless communications, CSI may refer to known channel properties of a communication link. The CSI may represent the combined effects of, for example, scattering, fading, and power decay with distance between a transmitter and receiver. Channel estimation may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

In certain systems (e.g., Release 13 long term evolution (LTE)). CSI feedback is generally based on a pre-defined codebook. This may be referred to as implicit CSI feedback. Precoding may be used for beamforming in multi-antenna systems. Codebook based precoding uses a common codebook at the transmitter and receiver. The codebook includes a set of vectors and matrices. The UE calculates a precoder targeting maximum single-user (SU) multiple input multiple output (MIMO) spectrum efficiency. The implicit CSI feedback can include a rank indicator (RI), a PMI, and associated channel quality indicator (CQI) based on the PMI. The PMI includes a $W_1$ precoding matrix and a $W_2$ precoding matrix.

In 3GPP Release 13 Full-Dimension MIMO (FD-MIMO), an official name for the MIMO enhancement, class A and class B type CSI feedback assumes PMI is constructed from a single DFT beam or single beam selection. Thus, an issue with the legacy CSI reporting is that the legacy CSI reporting (which typically has a low CSI resolution) may be insufficient to reflect (e.g., full) channel information, which in turn can degrade single/multi-user-MIMO (SU/MU-MIMO) performance, especially at larger antenna arrays.

Advanced CSI (Adv-CSI) reporting is designed to improve CSI accuracy by combining multiple beams (e.g., DFT beams) based on power and/or phasing based codebook. Adv-CSI generally has a dual codebook structure $W=W_1W_2$. $W_1$ may be reported on the wideband, and $W_2$ may be reported on the subband. $W_1$ may include a set of L orthogonal beams, e.g., 2D-DFT beams. The set of L beams may be selected from a set of oversampled 2D-DFT beams. $W_1$ may be constructed based on the L orthogonal beams and their power weights.

In NR, Type I feedback includes normal codebook-based PMI feedback with normal (low) spatial resolution, whereas Type II feedback includes enhanced "explicit" feedback and/or codebook-based feedback with higher spatial resolution. In NR, CSI feedback may support advanced CSI feedback at least in Type II feedback. The "resolution" of CSI feedback (e.g., codebook) may refer to the amount of information in the channel feedback and/or quality of the channel feedback. For example, lower resolution feedback, such as Type I feedback, may have a lower spatial resolution (reflecting a smaller number of the propagation paths of the channel between the transmitter and the receiver) compared to higher resolution feedback, such as Type II feedback, which may have a higher spatial resolution (reflecting a larger number of the propagation paths of the channel between the transmitter and the receiver). With lower resolution feedback, the BS may obtain a coarse approximation of the channel. However, such a coarse approximation may not be able to obtain sufficient performance for MIMO communications, especially MU-MIMO. Higher resolution feedback may enable the BS to obtain a more accurate approximation of the channel, which can boost the efficiency of MIMO communications.

There may be some drawbacks associated with advanced CSI reporting including, e.g., increases in feedback overhead, increased UE processing complexity and/or possible performance losses compared to legacy CSI reporting. In one reference example, the $W_1$ overhead for $N_1=N_2=4$ (in Adv-CSI) may include a total of 13 bits, where 8 bits (e.g., $\lceil \log 2(N_1N_2O_1O_2) \rceil = \lceil \log 2(16N_1N_2) \rceil = 8$) are used to indicate the leading $1^{st}$ beam, 3 bits are used to indicate the $2^{nd}$ beam, and 2 bits are used to indicate the relative power of the $2^{nd}$ beam. In some cases, advanced CSI reporting may achieve performance gain at the cost of an increased codebook size, which generally means that the total feedback overhead is increased. In such cases, the increased payload size associated with the feedback may exceed a limit (e.g., the limited payload size associated with periodic reporting on PUCCH). Additionally, in some cases, advanced CSI reporting may achieve performance gain at the cost of increased UE processing complexity. Further, in some cases, if the quantization for advanced CSI reporting is not properly configured (e.g., high resolution CSI is generally associated with high quantization levels), legacy CSI reporting may outperform advanced CSI reporting.

Certain aspects of the present disclosure provide techniques and apparatus for achieving high resolution CSI while reducing the feedback overhead associated with advanced CSI reporting. The compressed CSI reporting scheme described herein enables the BS to more efficiently acquire full channel information (e.g., the PMI as well as the CQI) that the BS can use for subsequent MIMO communications.

FIG. 7 is a flow diagram illustrating example operations 700 that may be performed, for example, by a UE (e.g., UE 120), for reducing CSI overhead, in accordance with certain aspects of the present disclosure.

Operations 700 may begin, at 702, where the UE receives a channel state information reference signal (CSI-RS), for example, from a BS. At 704, the UE determines one or more feedback components associated with a CSI feedback type based on the CSI-RS. At 706, the UE identifies that a payload of the one or more feedback components is to be compressed. At 708, the UE compresses the payload. At 710, the UE reports the compressed payload, for example, to the BS.

FIG. 8 is a flow diagram illustrating example operations 800 that may be performed, for example, by a BS (e.g., BS 110), for reducing CSI overhead, in accordance with certain aspects of the present disclosure.

Operations 800 may begin, at 802, where the BS receives a compressed payload of one or more feedback components associated with a channel state information feedback type, for example, from a UE. At 804, the BS decompresses the compressed payload. At 806, the BS determines a precoding to use for multiple input multiple output (MIMO) transmissions based on the decompressed payload. At 808, the BS may apply the precoding to MIMO transmissions with the UE.

In certain aspects, the BS may configure the UE to compress the payload of the feedback components. For instance, the identification at 706 that the payload is to be compressed may be based on an indication of a correlation between parameters associated with a precoding matrix indicator (PMI). The BS may provide the indication of the correlation between parameters to the UE, for example, via control signaling. In certain aspects, the UE may identify that the payload is to be compressed based on channel conditions, e.g., wideband channel conditions. The UE may also identify that the payload is to be compressed based on the size of the payload. For instance, the UE may compress the payload of the feedback components, if the size of the payload exceeds a limit, for example, 12 bits.

In certain aspects, the CSI feedback type (e.g., Type II CSI feedback) described in operations 700 and 800 provides a higher resolution of feedback than another type of CSI feedback (e.g., Type I CSI feedback). For instance, the feedback components in operations 700 and 800 may be associated with Type II CSI feedback as described herein.

In certain aspects, the feedback components may include a precoding matrix indicator (PMI), a channel quality indicator (CQI), and a rank indicator (RI) associated with Type II CSI feedback for wideband or subband resources. For example, PMI associated with Type II CSI feedback for a particular subband at rank1 with four beams may be represented as a linear combination codebook by the following expression:

$$W = B \times P_{wb} \times P_{sb} \times \theta_{sb} \quad (1)$$

where $$B = \begin{bmatrix} b_0 & b_1 & b_2 & b_3 & & & & \\ & & & & b_0 & b_1 & b_2 & b_3 \end{bmatrix},$$

$P_{wb} = \mathrm{diag}[p_{wb,0,0}\, p_{wb,0,1}\, p_{wb,0,2}\, p_{wb,0,3}\, p_{wb,1,0}\, p_{wb,1,1}\, p_{wb,1,2}\, p_{wb,1,3}]$, $P_{sb} = \mathrm{diag}[p_{sb,0,0}\, p_{sb,0,1}\, p_{sb,0,2}\, p_{sb,0,3}\, p_{sb,1,0}\, p_{sb,1,1}\, p_{sb,1,2}\, p_{sb,1,3}]$, and $\theta_{sb} = \mathrm{diag}[\theta_{sb,0,0}\, \theta_{sb,0,1}\, \theta_{sb,0,2}\, \theta_{sb,0,3}\, \theta_{sb,1,0}\, \theta_{sb,1,1} \cdots \theta_{sb,1,2}\, \theta_{sb,1,3}]^T$ B is a basis matrix of oversampled 2D DFT beams. $P_{wb}$ is a diagonal matrix of wideband beam amplitude scaling factors for the beams on two polarizations, $P_{sb}$ and is a diagonal matrix of subband beam amplitude scaling factors for the beams on two polarizations, $\theta_{sb}$ and is a matrix of subband phase coefficients for the beams on two polarizations.

In certain aspects, the payload of the feedback components associated with PMI may be compressed to reduce the overhead of the CSI feedback. That is, the compressed payload is indicative of one or more parameters associated with PMI, such as a basis matrix, phase, polarization, layer, wideband amplitude, or subband amplitude. For instance, in equation (1), the number of beams for linear combination impact the total number of coefficients (e.g., amplitude scaling factors and phase coefficients) used to construct W.

The feedback payload may be compressed at 708 by correlating beams to power values and phase values. For instance, a pre-combination matrix of the phase and amplitude for a set of beams may be formed by the following expression:

$$\tilde{B} = \begin{bmatrix} \tilde{b}_0 & \tilde{b}_1 & \\ & & \tilde{b}_0 & \tilde{b}_1 \end{bmatrix} \quad (2)$$

where $\tilde{b}_0 = [b_0\ b_1] \times [P_0 \theta_0\ p_1 \theta_1]^T$ $\tilde{B}$ is the pre-combination matrix for wideband or subband feedback, and $\tilde{b}_i$ is a pre-combination of the amplitude and phase scaling for a plurality of beams (e.g., beams [$b_0\ b_1$]). The correlated beams of the pre-combination matrix may be for wideband feedback and/or subband feedback.

In certain aspects, the BS may configure the beams to be correlated based on phase and amplitude. For instance, the UE may receive an indication of the correlation between the beams, the power values, and the phase values from the BS, for example, via control signaling. In certain aspects, the indication may be a mapping of the beams to be correlated based on phase and amplitude, such that the mapping identifies the beams from the basis matrix such as B of equation (1). For example, a bit map vector of {2, 1, 1} may indicate to the UE that the basis includes four beams, where the first value represented by '2' indicates a two-beam pre-combination, and the next two values indicate that the beams are not correlated as described herein.

In certain aspects, the UE may select, at 708, the beams to be correlated for the pre-combination matrix. That is, the UE may select the beams from the basis matrix to correlate to power values and phase values. For instance, the beams to be correlated may be selected based on a receive power associated with a wideband resource or subband resource. In some cases, the UE may select more beams to be correlated under strong channel conditions, while selecting fewer beams to be correlated under weak channel conditions.

The feedback payload may also be compressed at 708 by differentially encoding subband information for a plurality of subbands. In certain aspects, the differentially encoded subband information may be indicative of phase information. For instance, a first subband may include a full set of phase coefficient feedback, such as $\theta_{sb}$ of Equation (1), and the feedback for other subbands may be provided relative to any difference with the phase information of the first subband. The differentially encoded subband information results in reducing the payload overhead. In certain aspects, decompressing the payload at 804 may include differentially decoding subband information for a plurality of subbands, and the subband information may be indicative of phase information.

In certain aspects, a granularity of the differentially encoded subband information may be determined based on a wideband beam power for the plurality of subbands. That is, the UE may receive an indication of the granularity via wideband signaling from a base station, and the UE may determine the granularity of the differentially encoded subband information according to a received power of the wideband signaling. For instance, a higher granularity (i.e., greater resolution) may be used for weak channel conditions, and a lower granularity (i.e., lesser resolution) may be used for strong channel conditions.

In certain aspects, the payload of the feedback components may include an indication of whether phase feedback is associated with a wideband resource or a subband resource. The indication may be quantized as a bit flag, for example, '0' may indicate wideband phase information, and '1' may indicate subband phase information. The indication may be employed with the differentially encoded subband information as described herein. The indication may be configured by the base station via control signaling or selected by the UE. The indication may be per layer, beam, polarization, or any combination thereof. For instance, if the indication is per beam and polarization, then the total number of indications is R, where R is the reported rank. If the indication is per beam, layer, and polarization, then the total number of indications is provided by $(2*L-1)*R$, where L is the configured number of linear combination beams, and R is the reported rank.

The BS may decompress the received payload, at 804, according to the various compression schemes (e.g., wideband feedback, subband feedback, differential feedback, etc.) described herein. For instance, the BS may identify a correlation of beams to power and phase values as described herein, and the BS may determine the subband information associated with one or more subbands relative to particular subband as described herein.

FIG. 9 illustrates a call flow diagram of operations 900 (such as operations 700 and 800 as shown in FIGS. 7 and 8, respectively) to reduce the overhead of channel state information, in accordance with certain aspects of the present disclosure. As shown, at 902, the BS 110 may signal an indication of a correlation between parameters associated with a precoding matrix indicator. At 904, the UE 120 may receive the CSI-RS transmitted by the BS 110. At 906, the UE 120 may determine one or more feedback components associated with a CSI feedback type based on the CSI-RS. At 908, the UE 120 may identify that the payload is to be compressed, for example, based on the identification signaled at 902, the size of the payload, and/or the channel conditions. At 910, the UE 1290 may compress the payload. At 912, the UE 120 may report the compressed payload to the BS 110. At 914, the BS 110 may decompress the payload. At 916, the BS may determine a precoding to use for MIMO transmissions based on the decompressed payload. At 918, the BS 110 may transmit data and/or control signaling based on the precoding determined at 916.

Figure 10:
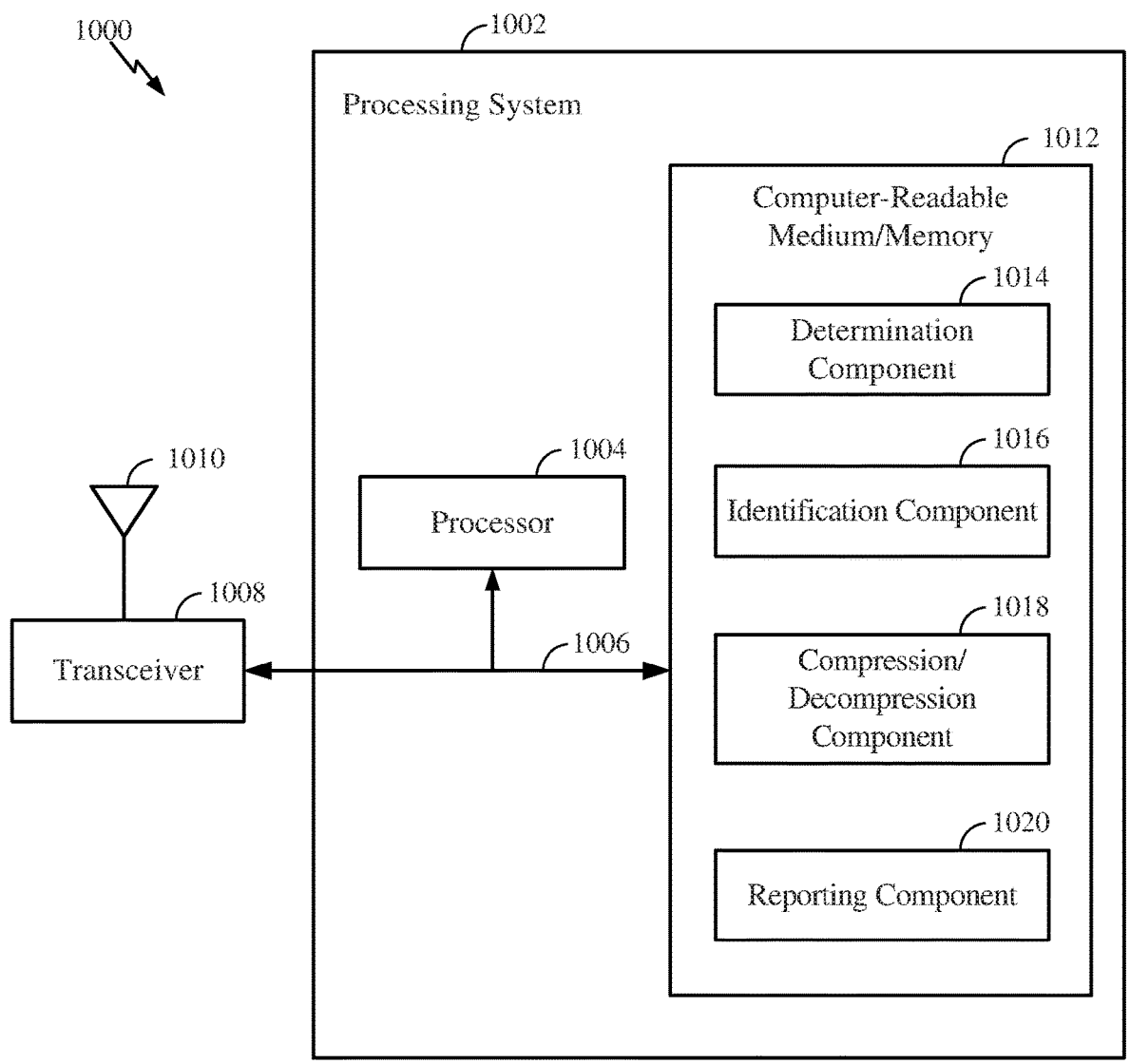
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIGS. 7 and 8. The communications device 1000 includes a processing system 1002 coupled to a transceiver 1008. The transceiver 1008 is configured to transmit and receive signals for the communications device 1000 via an antenna 1010, such as the various signals described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions that when executed by processor 1004, cause the processor 1004 to perform the operations illustrated in FIGS. 7 and 8, or other operations for performing the various techniques discussed herein.

In certain aspects, the processing system 1002 further includes a determination component 1014 for performing the operations illustrated in FIGS. 7 and 8. Additionally, the processing system 1002 includes an identification component 1016 for performing the operations illustrated in FIGS. 7 and 8. Additionally, the processing system 1002 includes a compression/decompression component 1018 for performing the operations illustrated in FIGS. 7 and 8. Additionally, the processing system 1002 includes a reporting component 1020 for performing the operations illustrated in FIGS. 7 and 8. The determination component 1014, identification component 1016, compression/decompression component 1018, and reporting component 1020 may be coupled to the processor 1004 via bus 1006. In certain aspects, the determination component 1014, identification component 1016, compression/decompression component 1018, and reporting component 1020 may be hardware circuits. In certain aspects, the determination component 1014, identification component 1016, compression/decompression component 1018, and reporting component 1020 may be software components that are executed and run on processor 1004.

Example Embodiments

In addition to the embodiments described above, many examples of specific combinations are within the scope of the disclosure, some of which are detailed below:

Embodiment 1

A method of wireless communication by a user equipment, comprising: receiving a channel state information reference signal (CSI-RS); determining one or more feedback components associated with a CSI feedback type based on the CSI-RS; identifying that a payload of the one or more feedback components is to be compressed; compressing the payload; and reporting the compressed payload.

Embodiment 2

The method of embodiment 1, wherein the CSI feedback type provides a higher resolution of feedback than another type of CSI feedback.

Embodiment 3

The method according to any of embodiments 1 or 2, wherein the CSI feedback type is Type II CSI feedback.

Embodiment 4

The method according to any of embodiments 1-3, wherein the compressed payload is indicative of one or more parameters associated with a precoding matrix indicator (PMI).

Embodiment 5

The method according to any of embodiments 1-4, wherein the identification that the payload is to be compressed is based on an indication of a correlation between parameters associated with a precoding matrix indicator (PMI).

Embodiment 6

The method according to any of embodiments 1-5, wherein compressing the payload comprises correlating beams to power values and phase values.

Embodiment 7

The method of embodiment 6, wherein the correlated beams are wideband feedback.

Embodiment 8

The method according to any of embodiments 6 or 7, further comprising receiving an indication of the correlation between the beams, the power values, and the phase values from a base station.

Embodiment 9

The method according to any of embodiments 6 or 7, further comprising selecting the beams to correlate to power values and phase values.

Embodiment 10

The method according to any of embodiments 1-9, wherein compressing the payload comprises differentially encoding subband information for a plurality of subbands.

Embodiment 11

The method of embodiment 10, wherein the subband information is indicative of phase information.

Embodiment 12

The method according to any of embodiments 10 or 11, wherein a granularity of the differentially encoded subband information is determined based on a wideband beam power for the plurality of subbands.

Embodiment 13

The method according to any of embodiments 10 or 11, further comprising receiving an indication of a granularity of the differentially encoded subband information via wideband signaling from a base station.

Embodiment 14

The method according to any of embodiments 1-13, wherein the payload includes an indication of whether phase feedback is associated with a wideband resource or a subband resource.

Embodiment 15

The method of embodiment 14, wherein the indication is determined per at least one of beam, layer, or polarization.

Embodiment 16

A method of wireless communication by a base station, comprising: receiving a compressed payload of one or more feedback components associated with a channel state information feedback type; decompressing the compressed payload; and determining a precoding to use for multiple input multiple output (MIMO) transmissions based on the decompressed payload.

Embodiment 17

The method of embodiment 16, wherein the CSI feedback type provides a higher resolution of feedback than another type of CSI feedback.

Embodiment 18

The method according to any of embodiments 16 or 17, wherein the CSI feedback type is Type II CSI feedback.

Embodiment 19

The method according to any of embodiments 16-18, wherein the compressed payload is indicative of one or more parameters associated with a precoding matrix indicator (PMI).

Embodiment 20

The method according to any of embodiments 16-19, wherein decompressing the payload comprises correlating beams to power values and phase values.

Embodiment 21

The method of embodiment 20, wherein the correlated beams are wideband feedback.

Embodiment 22

The method according to any of embodiments 20 or 21, further comprising signaling an indication of the correlation between the beams, the power values, and the phase values to a user equipment.

Embodiment 23

The method according to any of embodiments 1-22, wherein decompressing the payload comprises differentially decoding subband information for a plurality of subbands.

Embodiment 24

The method according to any of embodiments 1-23, wherein the subband information is indicative of phase information.

Embodiment 25

The method according to any of embodiments 1-24, wherein a granularity of the subband information is determined based on a wideband beam power for the plurality of subbands.

Embodiment 26

The method according to any of embodiments 1-25, further comprising signaling an indication of a granularity of the differentially encoded subband information via wideband signaling.

Embodiment 27

The method according to any of embodiments 1-26, wherein the payload includes an indication of whether phase feedback is associated with a wideband resource or a subband resource.

Embodiment 28

The method of embodiment 27, wherein the indication is determined per at least one of beam, layer, or polarization.

Embodiment 29

An apparatus for wireless communication, comprising: a receiver configured to receive a channel state information reference signal (CSI-RS); a processing system configured to: determine one or more feedback components associated with a CSI feedback type based on the CSI-RS, identify that a payload of the one or more feedback components is to be compressed, and compress the payload; and a transmitter configured to transmit the compressed payload.

Embodiment 30

An apparatus for wireless communication, comprising: a receiver configured to receive a compressed payload of one or more feedback components associated with a channel state information feedback type; and a processing system configured to: decompress the compressed payload, and determine a precoding to use for multiple input multiple output (MIMO) transmissions based on the decompressed payload.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair. DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7 and 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment, comprising:
   receiving a channel state information reference signal (CSI-RS);
   determining one or more feedback components associated with a CSI feedback type based on the CSI-RS;
   identifying that a payload of the one or more feedback components is to be compressed;
   compressing the payload, wherein compressing the payload comprises differentially encoding subband information for a plurality of subbands, wherein differentially encoding the subband information comprises encoding first subband information associated with a first subband relative to second subband information associated with a second subband; and
   reporting the compressed payload.

2. The method of claim 1, wherein the CSI feedback type provides a higher resolution of feedback than another type of CSI feedback.

3. The method of claim 1, wherein the CSI feedback type is Type II CSI feedback.

4. The method of claim 1, wherein the compressed payload is indicative of one or more parameters associated with a precoding matrix indicator (PMI).

5. The method of claim 1, wherein the identification that the payload is to be compressed is based on an indication of a correlation between parameters associated with a precoding matrix indicator (PMI).

6. The method of claim 1, wherein compressing the payload comprises correlating beams to power values and phase values.

7. The method of claim 6, wherein the correlated beams are wideband feedback.

8. The method of claim 6, further comprising receiving an indication of the correlation between the beams, the power values, and the phase values from a base station.

9. The method of claim 6, further comprising selecting the beams to correlate to power values and phase values.

10. The method of claim 1, wherein the subband information is indicative of phase information.

11. The method of claim 1, wherein a granularity of the differentially encoded subband information is determined based on a wideband beam power for the plurality of subbands.

12. The method of claim 1, further comprising receiving an indication of a granularity of the differentially encoded subband information via wideband signaling from a base station.

13. The method of claim 1, wherein the payload includes an indication of whether phase feedback is associated with a wideband resource or a subband resource.

14. The method of claim 13, wherein the indication is determined per at least one of beam, layer, or polarization.

15. A method of wireless communication by a base station, comprising:
   receiving a compressed payload of one or more feedback components associated with a channel state information feedback type;
   decompressing the compressed payload, wherein decompressing the payload comprises differentially decoding subband information for a plurality of subband s, wherein differentially decoding the subband information comprises decoding first subband information associated with a first subband relative to second subband information associated with a second subband; and
   determining a precoding to use for multiple input multiple output (MIMO) transmissions based on the decompressed payload.

16. The method of claim 15, wherein the CSI feedback type provides a higher resolution of feedback than another type of CSI feedback.

17. The method of claim 15, wherein the CSI feedback type is Type II CSI feedback.

18. The method of claim 15, wherein the compressed payload is indicative of one or more parameters associated with a precoding matrix indicator (PMI).

19. The method of claim 15, wherein decompressing the payload comprises correlating beams to power values and phase values.

20. The method of claim 19, wherein the correlated beams are wideband feedback.

21. The method of claim 19, further comprising signaling an indication of the correlation between the beams, the power values, and the phase values to a user equipment.

22. The method of claim 15, wherein the subband information is indicative of phase information.

23. The method of claim 15, wherein a granularity of the subband information is determined based on a wideband beam power for the plurality of subbands.

24. The method of claim 15, further comprising signaling an indication of a granularity of the differentially encoded subband information via wideband signaling.

25. The method of claim 15, wherein the payload includes an indication of whether phase feedback is associated with a wideband resource or a subband resource.

26. The method of claim 25, wherein the indication is determined per at least one of beam, layer, or polarization.

27. An apparatus for wireless communication, comprising:
   a memory;
   a receiver configured to receive a channel state information reference signal (CSI-RS);
   a processor coupled to the memory, the processor being configured to:
      determine one or more feedback components associated with a CSI feedback type based on the CSI-RS,
      identify that a payload of the one or more feedback components is to be compressed, and
      compress the payload, wherein to compress the payload, the processor is further configured to differentially encode subband information for a plurality of subbands,
   wherein to differentially encode the subband information, the processor is further configured to encode first subband information associated with a first subband relative to second subband information associated with a second subband; and
   a transmitter configured to transmit the compressed payload.

28. An apparatus for wireless communication, comprising:
   a memory;
   a receiver configured to receive a compressed payload of one or more feedback components associated with a channel state information feedback type; and
   a processor coupled to the memory, the processor being configured to:
      decompress the compressed payload, wherein to decompress the payload, the processor is further configured to differentially decode subband information for a plurality of subbands, wherein to differentially decode the subband information, the processor is further configured to decode first subband information associated with a first subband relative to second subband information associated with a second subband. and
determine a preceding to use for multiple input multiple output (MIMO) transmissions based on the decompressed payload.

\* \* \* \* \*